Figure 1:
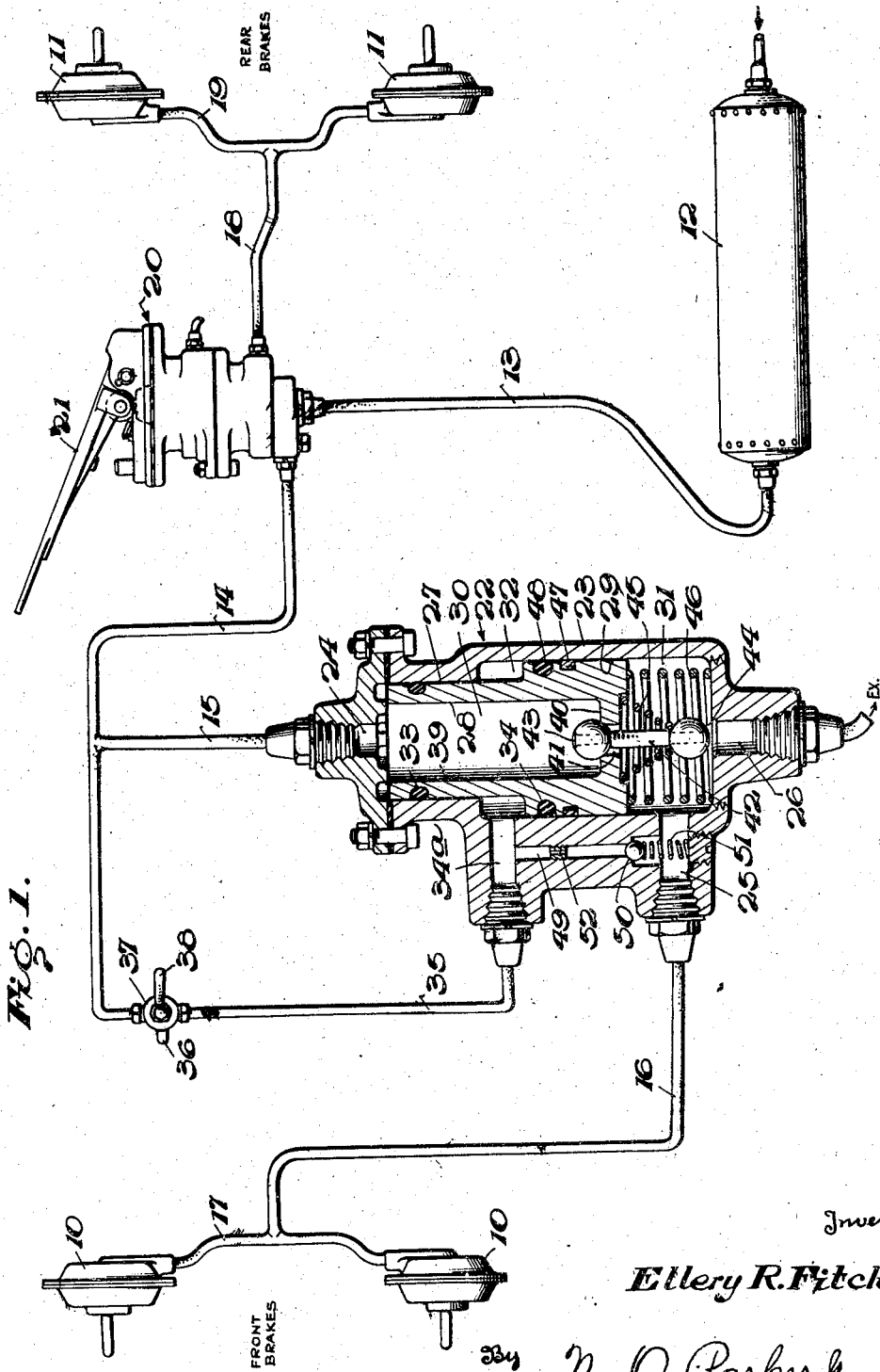

Aug. 20, 1946.  E. R. FITCH  2,406,284
BRAKE MECHANISM
Filed March 26, 1941  2 Sheets-Sheet 1

Inventor
Ellery R. Fitch
By N. D. Parker Jr.
Attorney

Patented Aug. 20, 1946

2,406,284

UNITED STATES PATENT OFFICE 2,406,284

BRAKE MECHANISM

Ellery R. Fitch, Pittsburgh, Pa., assignor to Bendix-Westinghouse Automotive Air Brake Company, Pittsburgh, Pa., a corporation of Delaware Application March 26, 1941, Serial No. 385,355

7 Claims. (Cl. 137—144)

This invention relates to fluid pressure apparatus and more particularly to fluid pressure braking systems adapted for use in connection with automotive vehicles.

One of the objects of the present invention is to provide, in a fluid pressure braking system having front and rear brakes, a novel arrangement wherein the braking effects at the front and rear wheels of the vehicle bear a predetermined ratio substantially throughout the range of braking pressures, the arrangement preferably being such that the braking effect at the front wheels of the vehicle will be less than but at all times proportional to the braking effect secured at the rear wheels of the vehicle, such a construction avoiding the possibilities of the front wheels becoming locked during braking of the vehicle.

Another object of the invention is to provide a novel fluid pressure apparatus in connection with a fluid pressure braking system which is so constituted as to reduce the pressure of the fluid supplied to the front brakes in such a manner that such pressure will be dependent upon the degree of pressure applied to the rear brakes.

A further object of the invention is to provide, in a fluid pressure apparatus of the above type, means controlled by the operator for rendering the pressure at the front brakes less than but proportional to the pressure at the rear brakes, or substantially equal to the rear brake pressure, depending on operating conditions.

A further object is to provide, in a mechanism of the above type, means for effecting a quick release of pressure from the front brakes such that, on release of the rear brakes, the front brake pressure will at all times be less than but substantially proportional to the rear brake pressure.

Yet another object of the invention is to provide a combined reducing and quick release valve for controlling the pressure in some of the vehicle brakes which shall insure a complete exhaust of fluid pressure from these brakes when the rest of the brakes are released.

Yet another object of the invention is to provide means for preventing undue vibration of the valve parts during operation.

Frictional means of some sort are sometimes used to prevent undue vibration in control valves for fluid pressure systems, and, under certain circumstances, such means have previously caused unnecessary pressure differentials between various portions of the valves, and it is accordingly another object of the present invention to provide a construction so constituted as to minimize the effects of this added friction as well as the inherent friction of the valve parts in causing such pressure differentials.

It has also been found desirable, in fluid pressure braking systems under certain conditions of operation when reducing valves of the above character are used to control the pressure to a portion of the brakes, to provide for equal pressures in all of the brakes except at the higher braking pressures, as it has been found by exhaustive tests that a large percentage of ordinary brake applications are made at relatively low pressures, and an arrangement of this type is very desirable in insuring that all of the brakes do their share of the work under these conditions. At the higher pressures, the reducing valve automatically cuts in to supply different but proportional pressures to the brakes in order to prevent the possibility of the front wheel brakes locking and affecting the steering of the vehicle. It is accordingly another object of the invention to provide a combined reducing and quick release valve which will be effective to supply equal pressures to all the brakes until a predetermined pressure is reached and to thereafter supply different but proportional pressures thereto.

Yet another object of the invention is to provide, in a control valve mechanism of the above type, means for insuring that small increments of pressure release will be substantially proportional from all the brake actuators.

A still further object is to provide a novel reducing and release valve with the parts so constructed and arranged so as to provide an unusually light weight and compact structure capable of ready inspection and repair, and of such construction as to be capable of being manufactured and installed on existing fluid pressure braking systems at a relatively low cost.

Other objects and features of novelty of the invention will appear more clearly from the following detailed description when taken in connection with the accompanying drawings, illustrating two embodiments of the invention. It is to be expressly understood, however, that the drawings are for purposes of illustration only and are not designed as a definition of the limits of the invention, reference being had for this purpose to the appended claims.

Figure 2:
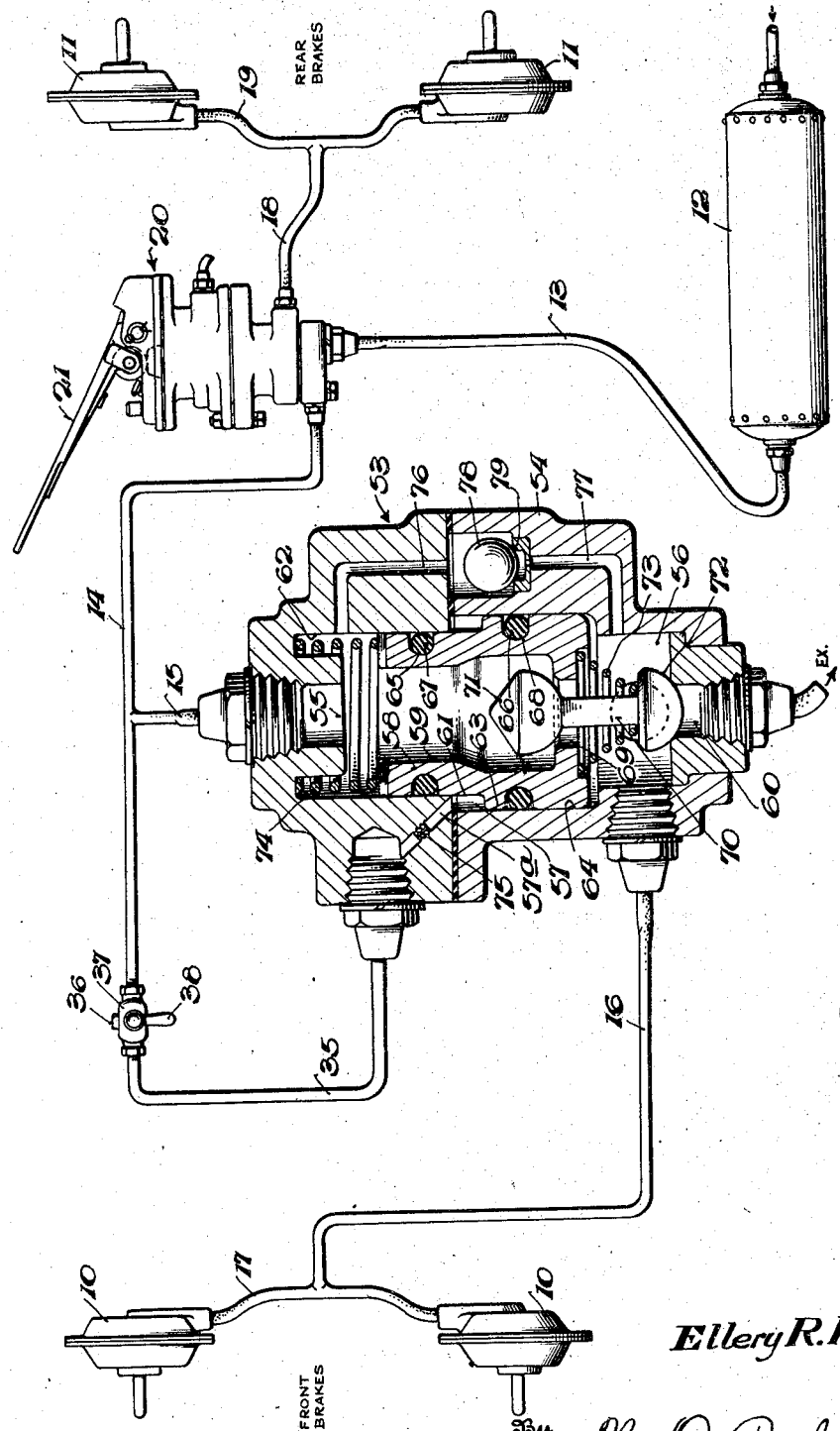

The two embodiments of the invention illustrated will be described in connection with the accompanying drawings, wherein similar reference characters refer to like parts throughout the several views, and in which:

Fig. 1 illustrates a diagrammatic arrangement, partly in section, of one form of the invention, and Fig. 2 illustrates, diagrammatically, partly in section, another embodiment of the invention.

Referring more particularly to Fig. 1, a fluid pressure braking system incorporating the present invention is shown therein as including front and rear brake actuators 10 and 11 respectively, a fluid pressure supply reservoir 12, supplied with fluid pressure from any suitable means, not shown, conduits 13, 14, 15, 16 and 17 for supplying fluid under pressure to the front brake actuators, and conduits 13, 18 and 19 for supplying fluid under pressure to the rear brake actuators. A brake valve 20, constructed in any well known manner, and preferably of the self-lapping type as disclosed in the patent to W. J. Andres and R. S. Sanford, No. 2,113,275, dated October 18, 1938, for Control mechanism, is positioned between conduit 13 and conduits 14 and 18 respectively, for controlling the flow of fluid under pressure from the reservoir 12 to the front and rear brake actuators. A manually operable control lever 21 is provided for operating the valve 20 in the above manner. The pressure of fluid supplied to the rear brake actuators 11 is directly controlled by the operation of the brake valve 20 in a manner well known to those skilled in the art.

An important feature of the present invention resides in the automatic control of braking pressures of the front brake actuators, and this control is effected in such a manner that, on application of the brake valve 20, the pressure supplied to the front brake chambers is proportional to but less than that supplied by the brake valve to the rear brake actuators. This control is effected by means of a combined pressure reducing and quick release valve 22 interposed between conduits 15 and 16 and comprising a casing 23 provided with an inlet port 24 connected to conduit 15, an outlet port 25 connected with conduit 16 and an exhaust port 26 connected with atmosphere. The upper portion of the casing is provided with a bore 27 adapted to slidably receive the smaller end of a double diameter valve actuating element or piston 28, an enlarged bore in the lower portion of the housing receiving an enlarged portion 29 of the piston. It will thus be apparent that the piston in cooperation with the casing divides the interior of the casing into a plurality of chambers, comprising an inlet chamber 30 connected with the inlet port as shown, an outlet chamber 31 connected with the outlet and exhaust ports and a third chamber 32. Sealing elements 33 and 34 are provided on the small and on the enlarged portions respectively of the piston, as shown, to prevent the flow of fluid pressure from the inlet and outlet chambers to the chamber 32, the latter being normally connected with atmosphere by way of an atmospheric port 34a formed in the casing, a conduit 35 connected thereto and exhaust port 36 of a conventional three-way valve 37, this valve normally serving to connect conduit 35 with exhaust port 36 and serving, when the valve operating handle 38 is moved to a position at right angles to that shown, to disconnect conduits 35 and 36 and to connect conduit 14 with conduit 35 in such a manner that the pressure supplied to conduits 14 and 18 from the source by the brake valve is likewise supplied to the chamber 32. The upper portion of the piston is provided with a bore 39 closed at its lower end by a partition 40 and this bore is adapted to be connected with the outlet chamber 31 by means of an inlet port 41 formed in the partition. Valve mechanism for controlling the inlet port and the exhaust port 26 includes a valve member 42 having an inlet valve 43 at its upper end and an exhaust valve 44 at the lower end, the inlet valve being normally held in a position to close the inlet port 41 by means of a valve spring 45 interposed between the partition 40 and the exhaust valve. The valve member 42 is of such length that the valve 44 is normally spaced from the upper end of the exhaust port 26 when the piston is at the upper end of its travel and the piston is normally maintained in this position by means of a relatively light spring 46 interposed between the lower end of the piston and the valve casing. It will be understood from the abive that the construction provides a valve mechanism for connecting conduits 15 and 16, so constructed that communication between conduits 15 and 16 is normally prevented while conduit 16 is normally connected with atmosphere, the result being that, when the brake valve 20 is in a position to exhaust conduits 14 and 15 as well as the rear brake actuators 11, no pressure is trapped in the brake actuators 10 to cause dragging of the brakes.

It will be readily apparent from the foregoing description that, on depression of the pedal 21 of the brake valve 20 to effect a brake application, any desired degree of pressure may be supplied to the rear brake actuators 11 dependent on the degree of depression of the pedal 21, while the same pressure will be supplied to the inlet chamber 30 of the reducing valve 22 through conduits 14 and 15. Since the valve spring 45 and the piston spring 46 are only tensioned sufficiently to hold the valves and piston in the position shown, the pressure supplied to the inlet chamber 30 acts on the small area of the piston in the inlet chamber with the result that the piston immediately moves downwardly, thus actuating the valve 44 to close the exhaust port 26, and acting on a further increase in pressure in the inlet chamber to move the piston away from the inlet valve 43 and establish communication between the inlet chamber 30 and the outlet chamber 31. Communication is thus established between the brake valve 20 and the front brake chambers 10 as soon as sufficient pressure has been supplied to the inlet chamber of the reducing valve to overcome the springs 45 and 46 to cause the actuation of the valves as described. As the pressure builds up in the outlet chamber 31, however, it will be understood that the forces acting on the piston due to fluid pressure will be unequal where equal pressures are supplied to both ends of the piston, due to the fact that the pressure acting on the lower end of the piston acts on a larger area than that acting on the upper end of the piston, and the opposing forces acting on the piston will thus balance with the pressure in the outlet chamber, being at all times less than the pressure in the inlet chamber. It will also be understood that, since there is a relatively high pressure acting on the upper end of the piston and a lower pressure acting on the lower end of the piston in opposition thereto, the fluid pressure forces acting on the piston will balance when the pressures in the inlet and outlet chambers are inversely proportional to the areas of the small and large ends of the piston. When this ratio of pressures is established, the force exerted by spring 46 on the piston will tend to move the piston upwardly to close the valve 43 and both valves will thereafter remain in closed or lapped position until the fluid pressure forces acting on the piston are again unbalanced either by operation of the brake valve 20 to increase or decrease the pressure in the inlet chamber 30 or on leakage of the valves 43 or 44 or in other portions of the system. With the valves in lapped position as described, operation of the brake valve 20 to release the brakes will act to release fluid pressure directly from the rear brake actuators 11, at the same time effecting a reduction of pressure in the inlet chamber 30 of the reducing valve which will unbalance the fluid pressure forces acting on the piston and allow the pressure below the piston in the outlet chamber 31 to move the piston upwardly, thus opening exhaust valve 44 and permitting fluid pressure to exhaust to atmosphere from the front brake chambers 10 through conduits 17 and 16, outlet port 25, outlet chamber 31 and exhaust port 26, whereupon the valve parts will again return to lapped position when the pressure in the chamber 31 is reduced to a value such that the forces acting in opposite directions on the piston due to fluid pressure are balanced. It will be clear from the foregoing description that the reducing valve parts can be so proportioned that any desired ratio of pressures can be obtained between the inlet chamber and the outlet chamber by simply varying the ratio of the differential piston areas.

While a brake control mechanism of the type described adapted to supply lower pressures to the front brake actuators than those supplied to the rear brake actuators is extremely desirable when the vehicle is operating on wet or icy pavements, such a control is often unnecessary when the vehicle is operating under good weather conditions, and in such cases it is desirable to have maximum braking force available at both the front and rear brakes. This operating condition is readily obtainable by the present invention and under the direct control of the operator, due to the provision of the three-way valve 37 actuated by the handle 38 for supplying pressure to the atmospheric chamber 32 of the reducing valve which is equal at all times to the pressure supplied to the rear brake actuators 11, it being pointed out that, on movement of the valve handle 38 to a position at right angles to that shown in the drawings, communication between the chamber 32 and atmosphere through port 34a, conduit 35, valve 37 and exhaust port 36, is cut off and communication is established between conduits 35 and 14, in such a manner that the pressure in the inlet chamber 30 of the reducing valve is the same at all times as the pressure in the atmospheric chamber 32. Under this condition of operation, it will be clear that the opposing forces acting on the piston due to fluid pressure in chambers 30 and 31 will at all times be equal when the pressures are equal, with the result that the application of fluid pressure to the inlet chamber 30 will actuate the piston to move the exhaust valve to closed position and the inlet valve to open position to permit a substantially equal pressure to be supplied to the front brake actuators. It is recognized that a slight pressure differential will exist between the inlet and outlet chambers of the reducing valve due to the force exerted by the valve spring 45 and the piston spring 46, but, as heretofore pointed out, these springs are of relatively light construction, and experiments show that these springs and the valve parts may be so designed that the above pressure differential has a very small value which is insufficient to be detrimental to satisfactory operation of the brakes. The controlling action exerted by the valve 37 on the operation of the reducing valve 22 under the direct control of the driver allows him to readily adjust the operation of the front wheel brakes to varying road conditions or load conditions of the vehicle without the necessity of leaving the driver's seat or stopping the vehicle to make the adjustment.

It will be clear from the foregoing description that the combined reducing and quick release valve heretofore described constitutes a valve of the so-called self-lapping type provided with inlet and exhaust valves which are sequentially operated, and which are both maintained in closed position when a predetermined relation of pressure balance is set up in the valve, and, as it is well known in the art that all self-lapping valves of this general nature have a tendency for the moving parts to vibrate during variation of the pressures applied to or released from the valves, damping means are provided for minimizing this undesirable vibration, such means being illustrated in the drawings as including a split ring 47 positioned in a groove 48 formed on the piston and so constituted as to normally exert a slight pressure against the walls of the large bore of the valve casing 23 so as to exert a slight retarding effect on the movement of the piston in either direction. The friction exerted by this ring as well as the friction between the piston and the casing and between the sealing rings 33 and 34 and the casing tends to delay downward movement of the piston to actuate the valves on application of pressure to the inlet chamber 30 from the brake valve, which causes a slight differential in pressure between the inlet and outlet chambers, even when the atmospheric chamber 32 is directly connected with the brake valve to cause operation of the reducing valve to supply a pressure to the front brake actuators substantially equal to that supplied to the rear brake actuators, so that, in an extreme case, it might be possible to have a pressure of thirty pounds, for example, in the inlet chamber 30, and a pressure of twenty-five pounds in the outlet chamber 31. A portion of this differential is caused by the friction exerted by the above described elements, and another portion of the differential pressure is due to the action of the springs 42 and 45 in opposing operation of the parts to open the inlet valve 43, and it may be assumed by way of example that the pressure differential due to friction is of the order of three pounds, and the pressure differential due to the action of the springs of the order of two pounds. Assuming the above pressure values, it is clear that, if the friction were eliminated with the valve operating to give an output pressure substantially equal to that of the input pressure, a pressure of thirty pounds in the inlet chamber would result in a pressure of twenty-eight pounds in the outlet chamber, but that, with the frictional effect added, the pressure in the outlet chamber cannot exceed twenty-five pounds. It is accordingly possible to minimize and practically overcome the pressure differential caused by frictional resistance by providing means for establishing a connection between the inlet and outlet portions of the valve mechanism, and this is accomplished in the present instance as illustrated in the drawings by means of a port 49 serving to connect ports 34a and 25, and normally closed at its lower end by means of a ball valve 50 held in place by a valve spring 51. The spring 51 is so tensioned as to permit the valve 50 to open when the pressure in the port 49 exceeds the pressure in the port 25 by an amount just in excess of the differential in pressures resulting from the action of springs 45 and 46, this spring force in the case of the example just cited being just in excess of that necessary to hold the valve 50 closed when the differential across the valve is equal to two pounds. If the valve were set to open at exactly two pounds pressure differential, there might be some tendency for leakage to occur past the valve which would tend to move the piston upwardly to open the exhaust valve, and, in order to prevent such leakage, the tension of the valve spring 51 is increased slightly beyond this value. It is also evident that, on a sudden application of pressure to the inlet chamber 30 on operation of the brake valve 20, there will be a tendency for the pressure to increase in the port 34a and in the port 49 with sufficient rapidity to permit a considerable volume of air to flow past the valve 50 with a resultant lag in the operation of the piston 27 to actuate the valves 43 and 44, and such action is prevented by the inclusion of a choke element 52 in the port 49, the area of which is so small in comparison with the area of the conduits supplying fluid pressure to the inlet chamber 30 as to prevent the passage of sufficient volume of fluid pressure through the port 49 to prevent a rapid build-up of pressure in the inlet chamber 30.

There has thus been provided in the embodiment of the invention hereinbefore described a novel and efficient valve mechanism capable of acting as a combined reducing valve and quick release valve serving to maintain a pressure in the front brake actuators 10 which is at all times proportional to but less than the pressure in the rear brake actuators 11, except when the pressure reducing function of the valve is rendered ineffective by the operation of the operator controlled valve 37, this latter phase of operation permitting the reducing valve to act to supply substantially the same pressure to the front brake actuators as is supplied to the rear brake actuators. Means have also been provided for effectively damping out any tendency for vibration of the valve parts as explained herein, and means have further been provided to minimize the effect of the frictional resistance imposed on the piston by this damping means as well as the frictional resistance of the other parts of the system to the end that the pressure in the front brake actuators under the latter type of reducing valve operation is at all times as nearly as possible equal to the pressure in the rear brake actuators.

Under some conditions of vehicle operation in connection with braking system of the type herein described, which are adapted to supply a pressure to the front brake actuators less than but proportional to the pressure supplied to the rear brake actuators, it has sometimes been found desirable to have these pressures substantially equal during initial application of the brakes at relatively low pressures, and to have the proportional pressure action effective only at the higher braking pressures, and the form of the invention illustrated in Fig. 2 of the drawings is so constituted as to accomplish this desirable result. The fluid pressure braking system illustrated in the drawings includes a fluid pressure reservoir 12 adapted to be connected to the rear brake chambers 11 by means of a conduit 13, a brake valve 20, and conduits 18 and 19, and may be connected to the front brake actuators 10 by means of conduit 13, brake valve 20, conduits 14 and 15, a combined reducing and quick release valve 53, and conduits 16 and 17, the construction of the valve 53 being substantially similar to that of the corresponding valve shown in Fig. 1 except for the arrangement of some of the internal parts. The valve 53 is provided with a casing 54 which is divided into an inlet chamber 55, an outlet chamber 56 and an atmospheric chamber 57 by means of a double diameter piston 58 slidably mounted in the housing and provided with a hollow bore 59 which forms a part of the inlet chamber 55. The inlet chamber is connected with brake valve 20 by means of conduits 15 and 14, the outlet chamber is connected to the front brake actuators by means of conduits 16 and 17, and may also be connected with atmosphere by means of an exhaust port 60 centrally formed in the lower wall of the valve casing 54. As in the case of the valve mechanism 22 shown in Fig. 1, the atmospheric chamber 57 may be alternately connected with atmosphere or with the conduit 14 leading to the brake valve through the operation of a conventional three-way valve 37 by means of an operating handle 38 serving to connect an atmospheric port 57a and conduit 35 for the purpose described heretofore in connection with the embodiment shown in Fig. 1. A reduced section 61 of the piston 58 is slidably mounted in a bore 62 formed in the upper portion of the valve casing and an enlarged portion 63 is adapted to slide in a correspondingly larger bore 64 formed in the lower part of the housing, sealing rings 65 and 66 being carried by the piston in grooves 67 and 68 formed thereon and serving to prevent communication respectively between the inlet chamber 55 and the atmospheric chamber 57 and between the outlet chamber 56 and the chamber 57. A port 69 is formed in the lower wall of the piston for permitting communication between the inlet chamber 55 and the outlet chamber 56, the flow of fluid pressure through this port and through the exhaust valve port 60 being controlled by means of a valve member 70 having an inlet valve 71 formed on its upper end and an exhaust valve 72 formed on its lower end, the valve member being positioned in relation to the piston and the bore 69 by means of a conical spring 73 interposed between the lower face of the piston and the upper face of the exhaust valve 72. In view of the fact that the present embodiment of the invention contemplates the transmission of equal pressures to the front and rear brake chambers during initial application of the brakes at relatively low pressures, it is desirable that communication be maintained between the inlet and outlet chambers of the valve 53 during such brake applications, and, in order to accomplish this desirable result, the piston 58 is normally held in a downward position by means of a relatively light spring 74 positioned between the upper face of the piston and the upper end of the valve casing 54, the tension of this spring being sufficient to balance and overcome the tension exerted in the opposing direction by the valve spring 73 in such a manner that the exhaust valve 72 is moved to a position closing the upper end of the exhaust port 60 while the inlet valve is spaced from the upper end of the inlet port 69 sufficiently to permit free passage of fluid under pressure from the inlet chamber to the outlet chamber and thence to the front wheel brake actuators through the conduits 16 and 17.

Assuming that the operator desires to effect an initial brake application of ten pounds pressure for checking the speed of the vehicle, it will be evident that, on movement of the brake valve operating lever 21 in an amount sufficient to establish this pressure in the rear brake actuators through the conduits 18 and 19, a similar pressure will be supplied to the inlet chamber 55 of the reducing valves through conduits 14 and 15, and, in view of the fact that the inlet valve 71 is normally opened and the exhaust valve 72 is closed, this same pressure will also be supplied to the front brake actuators through inlet port 69, outlet chamber 56 and conduits 16 and 17. With the valve 37 so positioned as to connect the atmospheric chamber 57 with atmosphere through port 57a, conduit 35 and exhaust port 36, it will be apparent that, on the establishment of the ten pound pressure in both the inlet and outlet chambers of the valve, the forces acting in opposite directions on the piston 58 due to fluid pressure acting on the opposing ends on areas equal to that of the smaller end will be equal, while an upward force will be exerted due to the action of fluid pressure on the annular area corresponding to that presented by the piston to the atmospheric pressure in the chamber 57, and, if it is desired to supply a pressure to the front brake actuators less than but proportional to that supplied to the rear brake actuators at all pressures of the rear brake actuators above ten pounds, it will be evident that the tension of the spring 74 may be so chosen as to permit upward movement of the piston to effect closure of the inlet port 69 by the valve 71 when a ten pound pressure is established in the inlet chamber, whereupon the valve mechanism will be moved to a lapped position and both valves will be closed. A further increase of pressure in the outlet chamber cannot be effected until the pressure in the inlet chamber is increased by an amount sufficient to move the piston downwardly against the action of the relatively light valve spring 73, it being pointed out that, when this action occurs, the piston will again be moved upwardly to close the inlet valve before the pressure in the outlet chamber 56 can increase to a value equal to that in the inlet chamber, it being understood that the pressure acting on the annular area heretofore described and on the balance of the lower end of the piston will move the piston upwardly to close the inlet valve while the pressure in the outlet chamber is still less than that in the inlet chamber. It will thus be apparent that, when the valves are in closed position, and neglecting the forces exerted on the piston by the springs 73 and 74, the opposing forces acting on the piston due to air pressure will be respectively a downward force having a value equal to the area of the small end of the piston multiplied by the pressure in the inlet chamber, and an upward force having a value equal to the total area of the lower end of the piston multiplied by the pressure in the outlet chamber, the respective pressures thus being at all times inversely proportional to the areas on opposite ends of the piston whenever the valves are in closed position. It will be understood that the spring 74 can be tensioned to permit substantially equal pressures in the front and rear brake chambers up to any desired braking pressure and that differential pressures will be obtained at all higher braking pressures, the pressure in the front brake actuators being less than but proportional to the pressure supplied to the rear brake actuators. In like manner, on operation of the brake valve to effect a release of fluid pressure from the rear brake chambers, the corresponding reduction of pressure in the inlet chamber 55 of the valve 53 will unbalance the opposing forces acting on the piston, allowing the pressure in outlet chamber 56 acting on the lower face of the piston to move the piston upwardly, thus moving the exhaust valve upwardly away from the exhaust port and permitting the escape of air from the front brake chambers to atmosphere until the pressures acting on the differential piston areas are again such that the valve mechanism laps with the inlet and exhaust valves in closed position.

In the event substantially equal pressures are desired in the front and rear brake actuators throughout the range of braking pressures, the operating handle 38 of the control valve 37 is moved to a position at right angles to the position shown on the drawings, and, as was the case in the mechanism illustrated in Fig. 1 of the drawings, this operation of the valves acts to connect the atmospheric chamber 57 of the reducing valve with the brake valve in such a manner that the pressures in the inlet chamber and the atmospheric chamber of the valve are at all times equal during the brake application. This being the case, it is apparent that the differential action of the piston is eliminated, and, as there is no unbalanced fluid pressure force acting to force the piston upwardly, the inlet valve normally remains open due to the fact that the piston is maintained in its downward position by the action of the piston spring 74. If the brake valve is now operated to effect a release of fluid pressure from the brakes, a reduction in pressure will occur in the inlet chamber 55 as well as in the atmospheric chamber 57, and, if the reduction is sufficiently rapid, the pressure acting on the lower face of the piston will tend to force it upwardly, closing the inlet valve and thereafter opening the exhaust valve to exhaust fluid pressure from the front brake actuators directly to atmosphere, and, as soon as the pressure in the outlet chamber 56 is reduced sufficiently to cause the force acting upwardly on the piston due to this pressure to balance the downward forces equal to the airpressure on the upper end of the piston and the force exerted by the spring 62, the valve parts will come to lapped position with both valves closed. It may be desirable in some cases to govern the rate of pressure reduction possible in the atmospheric chamber 57 in order to prevent sudden movement of the piston which will tend to cause vibration of the valve, and this desirable result can be obtained by the insertion of a choke 75 in the passage 57a.

As will be seen from the description in the previous paragraph, operation of the brake valve to effect a brake release results eventually in the parts of the reducing valve coming to lapped position where both valves are closed, and, since, under this condition, the pressure in the outlet chamber 56 is greater than the pressure in the inlet chamber 55 by an amount corresponding to the tension of the piston spring 74, it is considered advisable to provide means for substantially equalizing these pressures, and, to this end, a connection is provided between the inlet and outlet chambers which includes a pair of passages 76 and 77 formed in the casing, communication therethrough between chambers 55 and 56 being prevented by means of a ball check valve 78 normally resting against a suitable valve seat 79 as shown. With this arrangement, a slight excess of pressure in the chamber 56 is sufficient to lift the ball valve from its seat and allow the pressures to substantially equalize in the inlet and outlet chambers through the conduits 77 and 76, this construction allowing substantially equal pressures to exist at all times in the inlet and outlet chambers of the reducing valves regardless of whether the brakes are being applied or released.

Thus, the present invention provides a novel differential braking system having means for insuring a substantially equal degree of application of the front and rear brakes of the vehicle under one condition of operation, and having means under the control of the driver for changing the operation of the system to insure differential braking pressures in certain of the vehicle brake actuators, while, in the embodiment of the invention illustrated in Fig. 2 of the drawings, a novel differential braking system has been provided which is adapted to insure equal braking pressures in all of the brake actuators during partial brake applications and to insure differential pressures in the front and rear brake actuators during more severe brake applications, such an arrangement being particularly desirable to insure that the brakes will all do their share of their work during normal stopping operations, and at the same time to insure against sliding of the steering wheels of the vehicle when the vehicle is operating on slippery pavements. Since a large number of normal brake applications are made at low pressures, it will be evident that the latter arrangement will insure that all the brake shoes on the vehicle do their share of the work and that the wear on the brake lining will be more uniform than would be possible with other types of control. It will also be understood that the valve device heretofore described is so constructed as to eliminate the necessity of installing a separate quick release valve on the vehicle as has heretofore been necessary.

While there has been illustrated and described only two embodiments of the present invention, it is to be understood that the same may be utilized in various fluid pressure systems. For example, instead of controlling the degree of braking effect applied to the front and rear brakes of a vehicle, the present system may well be employed in a tractor-trailer fluid pressure braking system, whereby the degree of brake application of the tractor and trailer brakes is substantially equal under certain operating conditions, and wherein the tractor brakes are automatically controlled so that such application is less than but proportional to the degree of application of the trailer brakes when the pressure of the fluid applied in the system is above a predetermined value, or the brake control system may be so constituted that the pressure applied to the tractor brakes is at all times less than that applied to the trailer brakes, except when set by the driver to give equal pressures throughout the system. Various other changes and modifications of the device illustrated may be resorted to, as will be readily understood by those skilled in the art, without departing from the spirit of the invention. Reference will, therefore, be had to the appended claims for a definition of the limits of the invention.

What is claimed is:

1. A reducing valve provided with a casing having a movable element therein dividing the casing into inlet and outlet chambers, a port in said movable element for connecting said inlet and outlet chambers, an exhaust port in the outlet chamber, and a valve member carried by said element having intake and exhaust valve portions and normally positioned to close said connecting port, said valve operating element having one area subjected to the pressure in the inlet chamber and a relatively larger area subjected to the pressure in the outlet chamber, whereby an initial application of the pressure to the inlet chamber will actuate the element to close the exhaust port and open the connecting port and whereby the element will be operative to actuate the valves to maintain both ports closed when the pressures in said inlet and outlet chambers are substantially inversely proportional to said first and second areas.

2. Fluid pressure reducing valve mechanism provided with a casing, a pressure responsive element movably mounted in the casing and dividing the casing into an inlet chamber, an outlet chamber, and an atmospheric chamber, a port formed in said movable element for connecting said inlet and outlet chambers, an exhaust port in the outlet chamber, valvular means carried by the element having inlet and exhaust valve members for controlling said ports, means for normally maintaining said inlet valve in closed position, means for maintaining said exhaust valve in normally open position, said element being provided with an area subjected to a pressure in the outlet chamber normally greater than the area subjected to the pressure in the inlet chamber, whereby in response to a predetermined pressure supplied to the inlet chamber, the element actuates the valvular means to maintain a proportionately lower pressure in the outlet chamber, and means for subjecting the atmospheric chamber to the pressure obtaining in the inlet chamber, whereby the opposing fluid pressure forces on the element are substantially equal and the valves are actuated to maintain the pressures in the inlet and outlet chambers substantially equal.

3. Fluid pressure reducing valve mechanism of the type having a casing provided with an inlet port, an outlet port and an exhaust port, and adapted to maintain the pressure supplied to the outlet port through the valve mechanism at a value less than but proportional to the pressure supplied to the inlet port, said mechanism including inlet and exhaust valves in the casing for alternately connecting the inlet and outlet ports and the outlet and exhaust ports, and a pressure responsive element for operating the valves having an area responsive to the inlet pressure, a greater area responsive to the outlet pressure, and a third area equal in value to the difference between the first two areas and responsive to atmospheric pressure.

4. Fluid pressure reducing valve mechanism of the type having a casing provided with an inlet port, an outlet port and an exhaust port connected with atmosphere, said mechanism including a pair of valves in said casing operable for alternately connecting said inlet and outlet ports, said outlet and exhaust ports and for preventing communication between any of said ports, means for actuating said valves including a pressure responsive element having an area responsive to the pressure supplied to the inlet port, a second and larger area responsive to the pressure supplied to the outlet port and having a third area substantially equal in value to the difference between the first two areas and responsive to atmospheric pressure, and means for subjecting said third area at will to the pressure supplied to the inlet port, whereby the valves are actuated by said element to maintain the outlet pressure substantially equal to the inlet pressure.

5. Fluid pressure control valve mechanism of the type having a casing provided with an inlet port, an outlet port and an exhaust port connected with atmosphere and adapted to connect the inlet and outlet ports when the pressure supplied to the inlet port exceeds the pressure supplied to the outlet port by a predetermined ratio and to exhaust fluid pressure through an exhaust port when the difference in the pressure is supplied to said inlet and outlet ports is less than a predetermined ratio, said mechanism including valvular means in the casing for alternately connecting said inlet and outlet ports and for connecting said outlet port with atmosphere through the exhaust port, a pressure responsive element for actuating said valvular means having one area responsive to the pressure supplied to the inlet port, a second and larger area responsive to the pressure supplied to the outlet port and a third area equal to the difference between the first two areas and normally responsive to atmospheric pressure, whereby the valves are actuated to maintain the ratio of pressures between the inlet and outlet ports substantially inverse to that of the first two named areas, and means for subjecting said third area to the pressure supplied to the inlet port whereby the effective opposing areas on said element are rendered substantially equal and the pressure supplied to the outlet port is maintained substantially equal to that supplied to the inlet port.

6. Fluid pressure control valve mechanism of the type having a casing provided with inlet and outlet ports and adapted to supply fluid pressure from the inlet port to the outlet port at a pressure less than but proportional to the pressure supplied to the inlet port, said mechanism including valve means operable for establishing and disestablishing a connection between the inlet and outlet ports, a pressure responsive valve actuating element mounted in the casing having one area responsive to the pressure supplied to the inlet port and another larger area responsive to the pressure supplied to the outlet port for actuating said valve means to establish said connection when the pressure differential between said inlet and outlet ports exceeds a predetermined value and to disestablish said connection in response to a decrease in said pressure differential, a third area on said element normally responsive to atmospheric pressure, means for supplying fluid pressure from said inlet port to said third area whereby the opposing fluid pressure forces acting on said pressure responsive element are equalized, frictional means interposed between said element and casing for minimizing oscillating movement of said element, and means for minimizing the pressure differential between said inlet and outlet ports due to the action of said frictional means including a valve for permitting the flow of fluid in one direction between the inlet and outlet port when said last named pressure differential exceeds a predetermined value.

7. Fluid pressure control valve mechanism having a casing provided with an inlet port, an outlet port and an exhaust port and adapted for serially connecting said inlet and outlet ports and for connecting said outlet and exhaust ports in response to variations in the pressure supplied to said inlet port, said mechanism including valve means having inlet and exhaust valves for alternately connecting said inlet and outlet ports and said outlet and exhaust ports, a valve actuating element responsive jointly to inlet and outlet port pressures for controlling the operation of said valve means and having a portion of its area normally responsive to atmospheric pressure, whereby said element is actuated to close both valves when the pressure at the outlet port is less than the pressure at the inlet port by a predetermined ratio, and means for supplying inlet port pressure at will to said last named area, whereby said element is actuated to maintain the valves in closed position when the inlet and outlet port pressures are substantially balanced.

ELLERY R. FITCH.